May 25, 1926.
J. E. BERGSTRÖM
1,585,823
FEEDING DEVICE FOR MACHINE TOOLS
Filed June 9, 1921
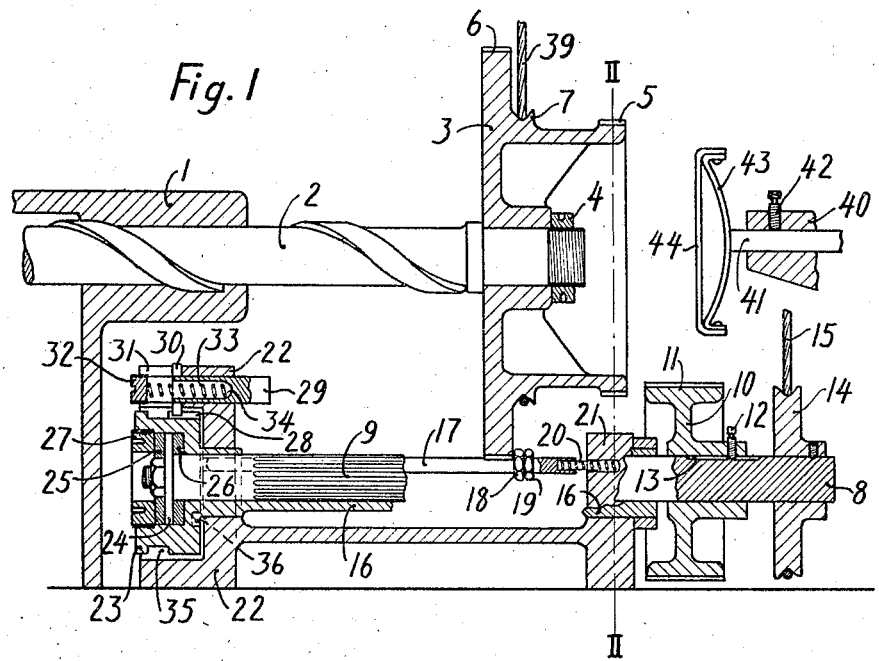
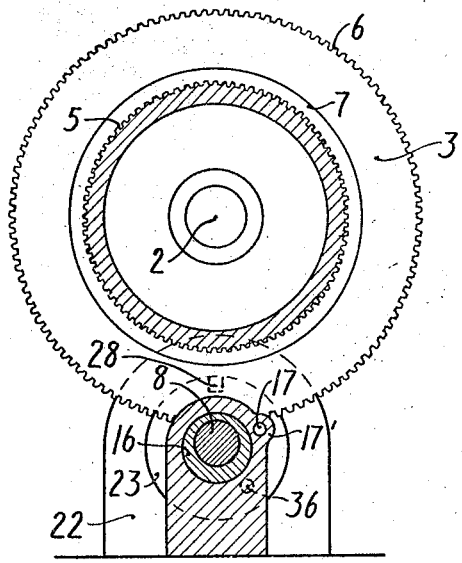
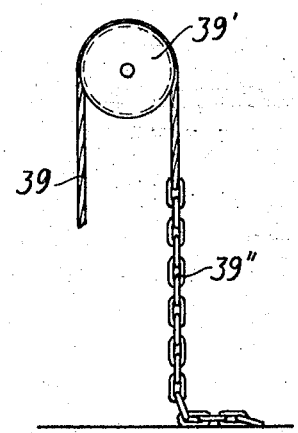
Inventor
Johan Erik Bergström
By B. Singer, Atty.

Patented May 25, 1926.

1,585,823

UNITED STATES PATENT OFFICE.

JOHAN ERIK BERGSTRÖM, OF DRESDEN, GERMANY, ASSIGNOR TO GUSTAF STAHLE, OF STOCKHOLM, SWEDEN.

FEEDING DEVICE FOR MACHINE TOOLS.

Application filed June 9, 1921. Serial No. 476,305.

The present invention relates to improved feeding devices for machine tools by means of which a composite motion is being imparted to the cutter or the like, one comparatively speedy motion toward the engaging position, one slow feed motion during the working period, and one quick back run.

In the accompanying drawings

Figure 1 is a longitudinal sectional view of an improved feeding mechanism constructed and arranged in accordance with my invention.

Figure 2 is a transverse sectional view of the same on the plane indicated by the line 2—2 of Figure 1.

Figure 3 is a detail elevation of a device for driving the disc pulley 3 backwards with decreasing force.

In the drawing 1 designates part of the body of the machine tool, 2 designates a screw spindle guided in the body in such manner, that the spindle, when turned, will be conveyed forward or backward. This spindle at one end carries the member (not shown) to which is to be imparted a feed motion. At the opposite end the spindle carries a disc pulley 3, which is rigidly connected thereto by means of a key and a collar or flange ring 4, so that both the rotary motion and the axial movement of the spindle will be imparted to the disc pulley. The disc pulley is provided with two rims of gear wheels, one rim 5 adapted to engage a rim 11 of a gear wheel 10, which latter by means of a set-screw 12, engaging a groove 13, can be fastened on an axle 8 in various axial positions. The rim 6 is adapted to engage longitudinal teeth 9 on the axle proper 8. The disc pulley is also provided with a groove engaging a driving member 39 for the running back of the spindle.

14 indicates a disc pulley fixed to the axle 8 by means of a set-screw or the like, and which is permanently driven by means of a rope or the like.

The axle 8 has a bearing in an excentric cradle 16, which, when revolved, will cause the axle 8 to be lifted more or less, in order to bring the teeth 9 and 11 into or out of engagement with the toothed rims 5 and 6. The axle 8 serves to rotate the cradle. The left end of said axle carries a disc 24 rigidly connected thereto, and has contact with leather rings or the like 25, 26, which are placed in the hollow head 23 of the cradle. For adjustment of the pressure between the rings and the disc 24 a nut 27 is provided which is screwed into the hollow head of the cradle. As a result of the friction between the disc 24 and the rings 25 and 26, the cradle 16 will be permanently rotated with the axle 8 unless it is stopped in some way or other. To effect such stopping a rod 17 is provided which is arranged in lugs 17' of the frame and which rod, when the head 26 is in a certain position, by means of a spring 20, which is supported in a recess 21 in the body portion 22, will engage a hole 36 in the head 23. To release the rod 17 from the recess 36 nuts 18 and 19 are provided which are screwed on said rod and may be secured thereto at any suitable point, so as to come into contact with the disc pulley 3, when the latter runs back.

For stopping of the head 23 I also provide a groove 28, which engages a finger 30 on a tap 29, a corresponding finger 30 on the opposite side being guided in a groove 31, in order to ensure the position of the tap. The tap 29 is pressed to the right by a spring 33 which rests in a recess in the tap, and at the other end presses against a plug 32, which is screwed into the body portion 22 directly opposite the tap 29.

The head 23 has a groove 35 which is arranged to engage the finger 30, when the tap 29 is pressed backwards to release the head 23.

39 designates a chain or the like which operates to drive the disc pulley 3 during the running back of the spindle 2. The driving force is delivered by a chain 39" which is connected to the cable 39 which runs on a conveying pulley 39'. As the free end of the chain is taken up by the floor the drawing force is decreased forward the end of the motion.

44 represents a brake strap which is adapted to come into contact with the edge of the disc 3 when the latter reaches its rearmost position, and is about to turn for moving the spindle 2 forwardly. The strap is fastened to a rigid stirrup 43 on a rod 41, which latter by means of a set-screw 42 may be suitably adjusted relatively to the frame portion 40 by means of which the brake is caused to work.

The arrangement described works in the following way:

In the position shown in the drawing the spindle is being fed forward, the long teeth 9 having engagement with the toothed rim 6, which latter will slide along the teeth 9, the cradle being held in convenient position for this engagement by means of the finger 30 which engages the groove 28 in the head 23. When the spindle 2 has reached the end of its course, the disc 3 will butt against the tap 29, whereby the finger 30 will be pressed into the groove 35. As soon as this takes place the cradle 16 will begin to revolve, the rings 25, 26 engaging the disc 24. After approximately one fourth revolution the tooth 9 will be out of engagement with the toothed rim 6, and simultaneously the rod 17 will engage the hole 36, and again stop the head 23 and the cradle 16. By means of the chain 39 and the grooves 7 the spindle will then run backwards independently of the driving gearing, until the disc 3 butts against the nut 18 and pulls the rod 17 out of engagement with the hole 36. The cradle 16 will then again be revolved, so that the toothed rim 11 will come beneath the rim 5. The head 23 being still free, however, the cradle will continue to revolve, so that the toothed rim 11 will engage the rim 5 and a comparatively speedy forward feeding of the spindle 2 is started. This movement lasts until the disc 3 has cleared the wheel 10. The cradle will then continue to revolve until the teeth 9 engage the teeth 6, the finger 30 being simultaneously driven into the groove 28 by the spring 33, so that the revolution of the cradle is discontinued and the normal slow feeding motion again starts.

It will be understood that the arrangement may be varied in many ways without departing from the scope and spirit of my invention. I do not, therefore, wish to be confined to the details thereof herein illustrated and described.

Having now described my invention what I claim is:

1. In feeding mechanism for machine tools of the class described, an eccentric cradle, a gearing axle having bearings in said cradle and provided with a pair of gears, a feed spindle having a driving wheel provided with toothed rims, one of said rims being arranged for engagement by the other gear according to the position of the eccentric cradle.

2. In a feeding arrangement as set forth in claim 1, a driving head for the cradle in permanent frictional engagement with the gearing axle and provided with grooves, stop catches to engage said grooves, said driving wheel being arranged to actuate said catches and releasing members actuated by the impact of said driving wheel.

3. In feeding mechanism for machine tools of the class described, an eccentric cradle, a gearing axle having bearings in said cradle and provided with a pair of gears, a feed spindle having a driving wheel provided with toothed rims, one of said rims being arranged for engagement by the other gear according to the position of the eccentric cradle and a chain engaged on said driving wheel and means to support one end of said chain so that said driving wheel may be run back by the weight of the chain and the power of the latter varied according to the free length thereof.

4. In a feeding arrangement for machine tools, a gearing axle having long teeth, an eccentric cradle bearing the said axle, a pulley having a toothed rim adapted for engagement with the gearing axle, a tooth wheel on the gearing axle, and a second gearing rim on the said pulley arranged for gearing therewith.

5. In a feeding arrangement for machine tools, a gearing axle having long teeth, an eccentric cradle bearing the said axle, a pulley having a toothed rim, a driving head for the cradle arranged in permanent frictional engagement with the gearing axle, means for stopping the said head after predetermined rotation and means for disengaging the stopping device.

6. In a feeding arrangement for machine tools, a feeding screw, a gearing axle having long teeth, an eccentric cradle bearing the said axle, a pulley having a toothed rim, a driving head for the cradle, a stopping device for the said head, disengaging means for the said stopping device, means for independent driving of the toothed wheel on the feeding screw and means for braking the backward motion of the feeding screw.

7. In a feeding arrangement for machine tools, a gearing axle having long teeth, an eccentric cradle bearing the said axle, a pulley having a toothed rim arranged for engagement with the gearing axle, and having a groove, a cable connected to the said groove and a chain connected to the cable and acting as a weight for turning the pulley when disengaged from the gearing axle.

In witness whereof I affix my signature.

JOHAN ERIK BERGSTRÖM.